(12) United States Patent
Guo et al.

(10) Patent No.: US 9,880,427 B2
(45) Date of Patent: Jan. 30, 2018

(54) COLOR FILTER SUBSTRATE, MANUFACTURING METHOD THEREOF AND DISPLAY PANEL

(71) Applicants: BOE TECHNOLOGY GROUP CO., LTD., Beijing (CN); HEFEI BOE OPTOELECTRONICS TECHNOLOGY CO., LTD., Hefei, Anhui (CN)

(72) Inventors: Lei Guo, Beijing (CN); Yong Jun Yoon, Beijing (CN); Zhizhong Tu, Beijing (CN); Dasheng Hui, Beijing (CN)

(73) Assignees: BOE TECHNOLOGY GROUP CO., LTD., Beijing (CN); HEFEI BOE OPTOELECTRONICS TECHNOLOGY CO., LTD., Hefei, Anhui (CN)

( * ) Notice: Subject to any disclaimer, the term of this patent is extended or adjusted under 35 U.S.C. 154(b) by 0 days.

(21) Appl. No.: 14/655,535

(22) PCT Filed: Oct. 11, 2014

(86) PCT No.: PCT/CN2014/088367
§ 371 (c)(1),
(2) Date: Jun. 25, 2015

(87) PCT Pub. No.: WO2015/055099
PCT Pub. Date: Apr. 23, 2015

(65) Prior Publication Data
US 2016/0004113 A1 Jan. 7, 2016

(30) Foreign Application Priority Data

Oct. 15, 2013 (CN) .......................... 2013 1 0484617

(51) Int. Cl.
*G02B 5/22* (2006.01)
*G02B 7/00* (2006.01)
(Continued)

(52) U.S. Cl.
CPC .... *G02F 1/13394* (2013.01); *G02F 1/133512* (2013.01); *G02F 1/133514* (2013.01);
(Continued)

(58) Field of Classification Search
CPC ........ G02B 5/201; G02B 5/285; G02B 5/223; G02B 5/003; G02F 1/133514;
(Continued)

(56) References Cited

U.S. PATENT DOCUMENTS 7,630,051 B2   12/2009  Lee
8,259,279 B2 *  9/2012  Shoraku ............. G02F 1/13394
                                                                349/156
(Continued)

FOREIGN PATENT DOCUMENTS

CN    101334561 A    12/2008
CN    102213857 A    10/2011
(Continued)

OTHER PUBLICATIONS

International Search Report Appln. No. PCT/CN2014/088367; dated Jan. 15, 2015.
(Continued)

*Primary Examiner* — Jade R Chwasz
(74) *Attorney, Agent, or Firm* — Ladas & Parry LLP; Loren K. Thompson

(57) ABSTRACT

A display panel includes: a color filter substrate including a first base substrate, a black matrix disposed on the first base substrate, and a plurality of spacers disposed on the black matrix a pillow layer provided at least part of the spacers and the black matrix; an array substrate cell-assembled with the
(Continued)

color filter substrate, wherein at least part of spacers disposed on the pillow layer is in contact with the array substrate by pressing.

16 Claims, 4 Drawing Sheets

(51) Int. Cl.
  *G02F 1/1339* (2006.01)
  *G02F 1/1335* (2006.01)
(52) U.S. Cl.
  CPC .............. *G02F 1/133516* (2013.01); *G02F 2001/13396* (2013.01); *G02F 2001/13398* (2013.01)

(58) Field of Classification Search
  CPC ......... G02F 1/133516; G02F 1/133512; G02F 1/13394; G02F 2001/13396; G02F 1/1339; G02F 2001/13398; G03F 7/0007; G03F 7/16; G03F 7/20; G03F 1/50; G03F 7/004
  USPC ........ 359/885, 892, 580, 582, 585, 588, 589
  See application file for complete search history.

(56) References Cited

U.S. PATENT DOCUMENTS

| | | | | |
|---|---|---|---|---|
| 2005/0237470 | A1* | 10/2005 | Kadotani | G02F 1/13394 349/155 |
| 2009/0180043 | A1* | 7/2009 | Rho | G02F 1/13338 349/12 |
| 2010/0007843 | A1 | 1/2010 | Shen | |

FOREIGN PATENT DOCUMENTS

| | | |
|---|---|---|
| CN | 103149741 A | 6/2013 |
| CN | 103529591 A | 1/2014 |
| JP | 2000-338503 A | 12/2000 |
| TW | 201003256 A | 1/2010 |

OTHER PUBLICATIONS

Written Opinion of the International Searching Authority Appln. No. PCT/CN2014/088367; dated Jan. 15, 2015.
First Chinese Office Action Appln. No. 20130484617.0; dated May 28, 2015.
Third Chinese Office Action Appln. No. 201310484617.0; dated Apr. 19, 2016.
Second Chinese Office Action dated Oct. 14, 2015; Appln. No. 201310484617.0.
Fourth Chinese Office Action dated Sep. 21, 2016; Appln. No. 201310484617.0.

* cited by examiner

COLOR FILTER SUBSTRATE, MANUFACTURING METHOD THEREOF AND DISPLAY PANEL

TECHNICAL FIELD

Embodiments of the invention relate to a color filter substrate, a manufacturing method thereof and a display panel using the color filter substrate.

BACKGROUND

As compared with a traditional cathode ray tube display device, a flat panel display device has advantages such as lightness and thinness, low driving voltage, no flicker and jitter and a long service life. The flat panel display device is divided into an active light-emitting display device and a passive light-emitting display device; for example, a thin film transistor-liquid crystal display (TFT-LCD) is the passive light-emitting display device, and is widely applied to an electronic product such as a television, a mobile phone and a monitor, due to advantages such as stable picture, realistic image, low radiation, space saving and energy saving, which has dominated a flat panel display field.

It has been known to the inventor that a liquid crystal display panel mainly includes a color filter substrate and an array substrate cell-assembled, and there is a liquid crystal layer interposed between the color filter substrate and the array substrate. Herein, a thickness of the liquid crystal layer (also known as a cell gap) is controlled mainly by a height of a spacer disposed between the array substrate and the color filter substrate, and the cell gap has important influence on structural parameters and display quality of the liquid crystal display device. The spacer used at present is generally a Post Spacer (PS), which is generally formed on a black matrix of the color filter substrate by a mask process, a photolithographic process and the like. The liquid crystal display panel is formed after cell-assembling the color filter substrate and the array substrate, and the PS located between the color filter substrate and the array substrate plays a role in supporting and buffering the above-described two substrates, so as to maintain a predetermined cell gap and ensure the stability of picture display.

Currently, a large-sized high-resolution television (such as a 65-inch ultra-HD television product, etc.) is increasingly favored by consumers. In a large-sized liquid crystal display panel, typically various different types of spacers are used to prevent a mura or a displaying defect. For example, FIG. 1 shows a cross-sectional view of a Triple PS known to the inventor, which includes a main spacer (main PS) 14, a first auxiliary spacer 15 and a second auxiliary spacer 16 disposed on the black matrix, and have a function of three-level buffering. Therein, the main spacer 14 is usually in a compressed state, with a main purpose to prevent occurrence of gravity Mura in the liquid crystal display panel. Here, the gravity Mura refers to that when the liquid crystal display panel is placed vertically, liquid crystal material will accumulate to a lower portion of the liquid crystal display panel by gravity, resulting in expansion of the lower portion of the liquid crystal display panel, while a vacuum occurs in an upper portion of the liquid crystal display panel; and under effect of external atmospheric pressure, the upper portion of the liquid crystal display panel is pressed, resulting in serious nonuniformity between cell gap of the upper portion and cell gap of the lower portion of the liquid crystal display panel, so as to cause unevenness in the picture display. In the large-sized liquid crystal display panel, since a large amount of liquid crystal is injected, the gravity Mura is more apt to occur. The main spacer 14 is usually disposed in the upper portion of the liquid crystal display panel, and prevents the occurrence of the gravity Mura through its own elasticity, when the liquid crystal display panel is placed vertically. Therefore, a compression amount of the main spacer 14 has significant correlation with an upper limit of the liquid crystal amount injected into the liquid crystal display panel and an ability to prevent the gravity Mura. Simply put, the larger the compression amount of the main spacer 14, the more the pressure it can withstand so as to maintain the cell gap unchanged, and the less likely the gravity Mura will occur, and correspondingly, the more liquid crystal material can be injected, so as to enhance a picture display effect.

Since the spacer is usually formed on the color filter substrate, as shown in FIG. 2, in order to further increase the compression amount of the main spacer 14, typically an auxiliary pillow layer 24 is formed by using functional film layers 23 on the array substrate, the main spacer 14 is in contact with the auxiliary pillow layer 24 by pressing, and the compression amount of the main spacer 14 is increased by using the auxiliary pillow layer 24. However, since a thickness of the auxiliary pillow layer 24 is determined by thicknesses of the functional film layers 23 on the array substrate, for example, when the auxiliary pillow layer is disposed in a same layer with a gate metal layer, the thickness of the auxiliary pillow layer is equal to a thickness of the gate metal layer, and when the auxiliary pillow layer is disposed in a same layer with a passivation layer, the thickness of the auxiliary pillow layer is equal to a thickness of the passivation layer; while the thicknesses of each of the functional film layers on the array substrate are all fixed values, which cannot be changed arbitrarily, and thus the thickness of the auxiliary pillow layer 24 cannot be changed continuously, i.e., only some specific compression amounts can be satisfied, but it is hard to meet requirements of various changed compression amounts. Besides, in principle, the continuous change of the compression amount can also be achieved by continuous change of a height of the spacer per se; but in fact, the height of the spacer is determined by a diameter of the spacer; once the diameter of the spacer is determined according to a space on the array substrate and a size parameter of the black matrix, it means that the height of the spacer can be changed only within a short range, so the continuous change of the compression amount cannot be truly achieved, either, i.e., it is impossible to meet the requirements of various changed compression amounts.

In addition, in the pursuit of the large-screen ultra-HD product, it is bound to bring an increase in power consumption of the display panel, which is in conflict with an energy-saving and low-carbon concept of environmental protection. In an oxide-semiconductor thin film transistor (Oxide-TFT) driving technology, since an oxide semiconductor has a relatively high electron mobility (about 100 times faster than that of a conventional amorphous silicon), the power consumption of the liquid crystal display panel can be greatly reduced, which thus has unparalleled technical advantages in the large-sized liquid crystal display products, and is rated as a new generation of liquid crystal display technology which is the most promising, and has a good market prospect. However, in the Oxide-semiconductor-TFT liquid crystal display panel, as compared with the conventional liquid crystal display panel with the amorphous silicon thin film transistor, a thickness of a functional film layer formed by the oxide semiconductor is very small, which is typically 0.05 μm, far less than a thickness of a functional film layer formed by the conventional amorphous silicon (typically 0.23 μm); and thereby, although a thickness of the array substrate is reduced, yet the compression amount of the main spacer is also reduced by nearly 10% (a ratio of the compression amount to an original height thereof); typically, the compression amount of the main spacer is, only about 15% at most (the ratio of the compression amount to the original height thereof), but an insufficient compression amount of the main spacer is bound to result in the occurrence of the gravity Mura; since the thickness of the auxiliary pillow layer is relatively fixed, it is necessary to increase the height of the spacer, and but, an increase in the height of the spacer means necessity to increase the diameter of the spacer, so that the material cost is greatly increased. In addition, limited by the space on the array substrate and the size parameter of the black matrix, the diameter and the height of the spacer are not infinitely changeable at all. All these factors limit design of the spacer, so that the compression amount of the Oxide-TFT liquid crystal display panel is relatively small, and there is a risk of the gravity Mura, meanwhile problems such as increase of the material cost of the spacer and reduction of production capacity will also be caused.

SUMMARY OF THE INVENTION

Embodiments of the present invention provide a color filter substrate which can flexibly control a compression amount of a spacer and a manufacturing method of the color filter substrate, as well as a display panel.

In one aspect, an embodiment of the present invention provides a color filter substrate, comprising: a first base substrate; a black matrix, disposed on the first base substrate; and a plurality of spacers, disposed on the black matrix, wherein at least one of the spacers and the black matrix are provided with a pillow layer therebetween.

In another aspect, an embodiment of the present invention provides a method for manufacturing the above-described color filter substrate, comprising a step of forming the pillow layer as described above.

In still another aspect, an embodiment of the present invention further provides a display panel, comprising: a color filter substrate as described above; and an array substrate, cell-assembled with the color filter substrate, wherein at least part of the spacers disposed on the pillow layer are in contact with the array substrate by pressing.

BRIEF DESCRIPTION OF THE DRAWINGS

In order to clearly illustrate the technical solution of the embodiments of the invention, the drawings of the embodiments will be briefly described in the following; it is obvious that the described drawings are only related to some embodiments of the invention and thus are not limitative of the invention.

DESCRIPTION OF THE EMBODIMENTS

In order to make objects, technical details and advantages of the embodiments of the invention apparent, the technical solutions of the embodiment will be described in a clearly and fully understandable way in connection with the drawings related to the embodiments of the invention. It is obvious that the described embodiments are just a part but not all of the embodiments of the invention. Based on the described embodiments herein, those skilled in the art can obtain other embodiment(s), without any inventive work, which should be within the scope of the invention.

Hereinafter, embodiments of the present invention will be further described in conjunction with the accompanying drawings. The embodiments below are only intended to illustrate the present invention, but are not intended to limit the scope of the present invention.

A color filter substrate provided by an embodiment of the present invention comprises a first base substrate; a black matrix disposed on the first base substrate; and a plurality of spacers disposed on the black matrix, at least part of the spacers and the black matrix are provided with a pillow layer therebetween, a compression amount of the spacer is increased by using the pillow layer, which reduces possibility of gravity Mura, and improves picture display quality and reliability of a display device. Moreover, a thickness of the pillow layer in embodiments of the present invention can be flexibly set according to needs, continuous change of the thickness of the pillow layer can be achieved, so the compression amount of the spacer can be flexibly controlled, which is not necessarily limited to various restrictions in the prior art. Hereinafter, the embodiments of the present invention are described in more detail in conjunction with first to fourth embodiments.

A First Embodiment

Figure 1:
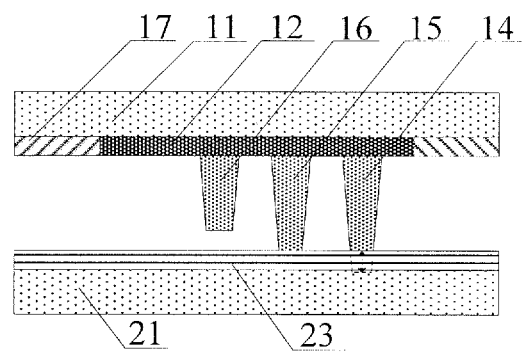
FIG. 1 is a cross-sectional structural schematic diagram of a spacer portion in a conventional display panel.
Figure 2:
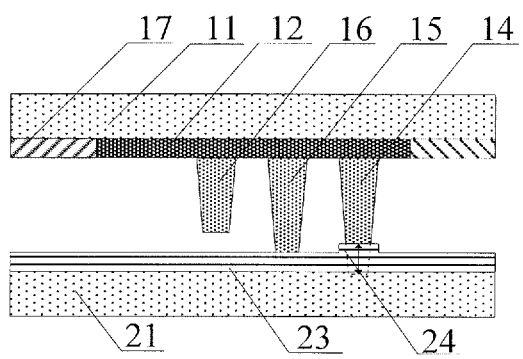
FIG. 2 is another cross-sectional structural schematic diagram of the spacer portion in the conventional display panel.
Figure 3:
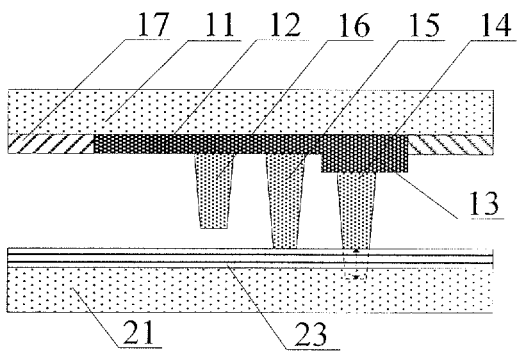
FIG. 3 is a cross-sectional structural schematic diagram of a color filter substrate and a spacer portion in a display panel according to a first embodiment of the present invention.

The embodiment provides a color filter substrate, as shown in FIG. 3, the color filter substrate comprising: a first base substrate 11; a black matrix 12 and a color filter layer 17 disposed on the first base substrate 11; and a plurality of spacers disposed on the black matrix 12. The spacer in this embodiment includes a main spacer 14, a first auxiliary spacer 15 and a second auxiliary spacer 16, the main spacer 14 being disposed on a pillow layer 13, and the first auxiliary spacer 15 and the second auxiliary spacer 16 being directly disposed on the black matrix 12; wherein the main spacer 14 is mainly used for preventing gravity Mura, the first auxiliary spacer 15 is mainly used for preventing Push Mura, and the second auxiliary spacer 16 is mainly used for preventing press Mura.

Alternatively, the first auxiliary spacer 15 and the second auxiliary spacer 16 may not be disposed, or one of the first auxiliary spacer 15 and the second auxiliary spacer 16 is disposed, or other types of auxiliary spacers are disposed, which are not limited to the mode listed in the embodiment.

Since it is necessary to ensure a relatively large compression amount of the main spacer 14, the pillow layer 13 is disposed between the main spacer 14 and the black matrix 12, and the compression amount of the main spacer 14 is increased by using the pillow layer 13, which reduces a risk of the occurrence of the gravity Mura.

This embodiment further provides a manufacturing method of the above-described color filter substrate, and in addition to common conventional steps for producing the color filter substrate, the manufacturing method of the color filter substrate further comprises a step of forming the above-described pillow layer 13. Exemplarily, the pillow layer 13 may be separately formed between the first base substrate 11 and the black matrix 12, or may be separately formed on the black matrix 12. Further, in order to reduce the number of processes, improve productivity, reduce the production cost and increase stability of connection between the pillow layer 13 and the black matrix 12, the pillow layer 13 and the black matrix 12 in this embodiment may be of an integral structure, i.e., the pillow layer 13 may be formed while the black matrix 12 is formed.

It is known to the inventor that the black matrix 12 is usually made of resin material containing a black colorant (e.g., carbon black), i.e., it is made of a black resin; and the resin black matrix 12 has advantages such as low reflectance and low cost. The black resin is divided into a photosensitive resin and a non-photosensitive resin; for the photosensitive black resin, the black matrix 12 may be formed directly by a photolithography process; and for the non-photosensitive black resin, the black matrix 12 may be formed by a patterning process with photoresist.

Exemplarily, in the embodiment, when the black matrix 12 and the pillow layer 13 are formed by using the photosensitive black resin, the method comprises steps of:

A1: cleaning the first base substrate 11, wherein exemplarily, the first base substrate 11 may be a glass substrate or a quartz substrate and the like; coating a photosensitive black resin layer or other light-absorbing material layer on the first base substrate 11, a thickness of the coated black resin layer directly determining a thickness of the pillow layer 13 finally formed, and the thickness of the pillow layer 13 being specifically set according to factors such as a cell gap of the display panel to be formed finally and the compression amount of the main spacer 14. Exemplarily, it is derived by calculating that: a sum of thicknesses of the pillow layer 13 and the black matrix 12 is 1.05~3.15 μm, and correspondingly, a thickness of the coated black resin layer is 1.05~3.15 μm.

Figure 4A:
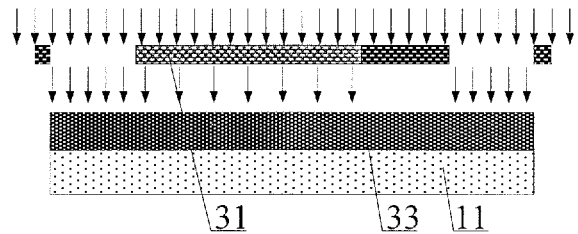
FIG. 4a-FIG. 4b are cross-sectional views of steps of a manufacturing method of a color filter substrate when a black matrix is formed by a photosensitive black resin according to the first embodiment of the present invention.
Figure 4B:
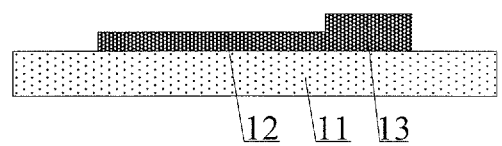

A2: forming the black matrix 12 and the pillow layer 13 by a photolithography process;

Exemplarily, the step mainly includes:

A201: as shown in FIG. 4a, exposing the photosensitive black resin layer 33 by a dual-tone mask 31, to form a black resin completely-retained region corresponding to the pillow layer 13, a black resin partly-retained region corresponding to the black matrix 12 and a black resin completely-removed region corresponding to a region except the above-described regions;

A202: performing developing treatment, as shown in FIG. 4b, and completely removing the black resin layer 33 in the black resin completely-removed region; completely retaining the black resin layer 33 in the black resin completely-retained region, as the pillow layer 13; and removing a partial thickness of the black resin layer 33 in the black resin partly-retained region, as the black matrix 12.

Continuous change of the thickness of the photosensitive black resin layer can be ensured by controlling exposure amount, developing time and concentration of a developer used in developing, so as to flexibly control a step difference between the black matrix 12 and the pillow layer 13, and the thickness of the pillow layer 13 can be flexibly set according to needs.

When the black matrix 12 and the pillow layer 13 are formed by using the non-photosensitive black resin, the method comprises steps of:

S1: cleaning the first base substrate 11, wherein exemplarily, the first base substrate 11 may be a glass substrate or a quartz substrate; coating a non-photosensitive black resin layer or other light-absorbing material layer on the first base substrate 11, the thickness of the coated black resin layer directly determining the thickness of the pillow layer 13 finally formed; and the thickness of the pillow layer 13 being specifically set according to the factors such as the cell gap of the display panel to be formed finally and the compression amount of the main spacer 14 (for example, if an auxiliary spacer is disposed on the array substrate, it is also necessary to consider influence of the auxiliary spacer). Exemplarily, it is derived by calculating that: the sum of thicknesses of the pillow layer 13 and the black matrix 12 is 1.05~3.15 μm, and correspondingly, the thickness of the coated black resin layer is 1.05~3.15 μm.

S2: forming the black matrix 12 and the pillow layer 13 by a patterning process.

Figure 5A:
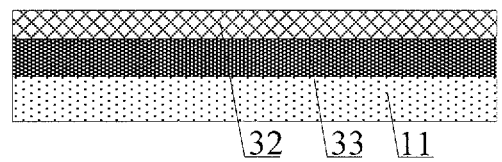
FIG. 5a-FIG. 5g are cross-sectional views of steps of the manufacturing method of the color filter substrate when the black matrix is formed by a non-photosensitive black resin according to the first embodiment of the present invention.
Figure 5B:
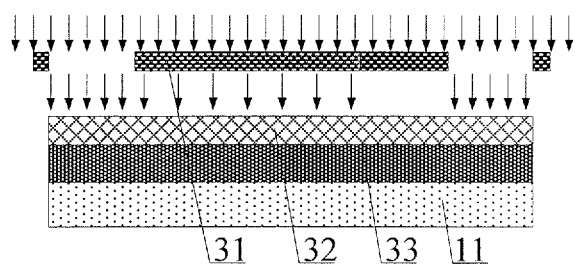
Figure 5C:
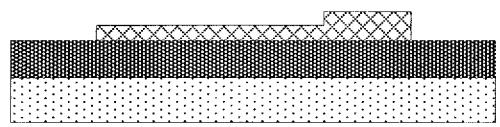
Figure 5D:
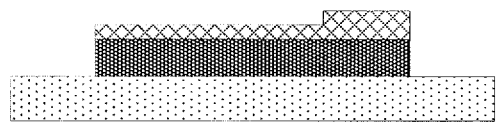
Figure 5E:
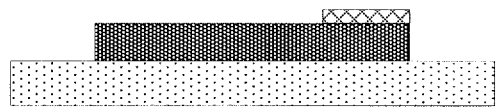
Figure 5F:

Exemplarily, the step S2 includes steps of:

S201: as shown in FIG. 5a, coating a photoresist layer 32 on the black resin layer 33;

S202: as shown in FIG. 5b, exposing by the dual-tone mask 31, to form a photoresist completely-retained region corresponding to the pillow layer 13, a photoresist partly-retained region corresponding to the black matrix 12 and a photoresist completely-removed region corresponding to a region except the above-described regions; performing developing treatment, as shown in FIG. 5c, after the developing treatment, completely retaining the photoresist in the photoresist completely-retained region, completely removing the photoresist in the photoresist completely-removed region, and removing a partial thickness of the photoresist in the photoresist partly-retained region;

S203: as shown in FIG. 5d, removing the black resin layer 33 in the photoresist completely-removed region by a first etching process;

S204: as shown in FIG. 5e, removing the photoresist in the photoresist partly-retained region by an ashing process;

S205: as shown in FIG. 5f, removing a partial thickness of the black resin layer 33 in the photoresist partly-retained region by a second etching process;

Continuous change of the thickness of the non-photosensitive black resin layer 33 can be ensured by controlling etching time and concentration of an etching solution used in the etching, so as to flexibly control the step difference between the black matrix 12 and the pillow layer 13, and the thickness of the pillow layer 13 can be flexibly set according to needs.

Figure 5G:
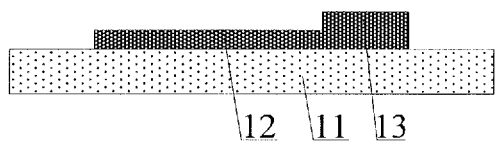

S206: as shown in FIG. 5g, stripping the remaining photoresist, the black resin layer 33 finally retained serving as the black matrix 12 and the pillow layer 13.

The manufacturing method of the color filter substrate according to the embodiment is merely an implementation method of the color filter substrate provided by the embodiment, but in fact, the embodiment of the present invention may also be implemented by modifying the implementation method through increasing or reducing the number of processes, and selecting different materials or material combinations.

The embodiment further provides a display panel using the above-described color filter substrate; as shown in FIG. 3, the display panel comprises the above-described color filter substrate and the array substrate cell-assembled with the color filter substrate, the array substrate including a second base substrate 21 and a plurality of functional film layers 23 formed on the second base substrate 21; the main spacer 14 disposed on the pillow layer 13 being in contact with the array substrate by pressing, the first auxiliary spacer 15 being in contact with the array substrate without a compression amount, and the second auxiliary spacer 16 being suspended without being in contact with the array substrate.

Exemplarily, by conducting calculation according to the material and a size of the spacer, the compression amount of the main spacer 14 in contact with the array substrate by pressing is 10%~20%, which may be, for example, 15%, etc. of an initial height of the main spacer 14.

Figure 6:
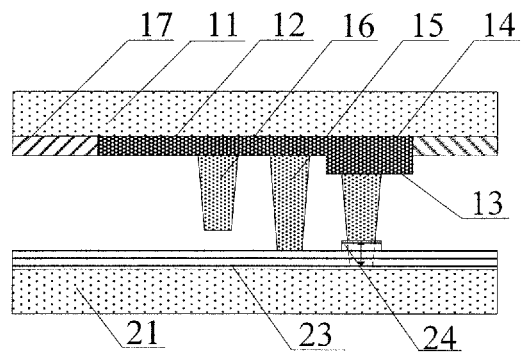
FIG. 6 is another cross-sectional structural diagram of a color filter substrate and a spacer portion in a display panel according to the first embodiment of the present invention.

To further increase the compression amount of the main spacer 14 or reduce the height of the main spacer 14 under a same compression amount, so as to save material and reduce the cost, as shown in FIG. 6, an auxiliary pillow layer 24 is disposed at a position on the second base substrate 21 or the functional film layer 23 corresponding to a region where the spacer is in contact with the array substrate by pressing; and a function, a structure and a manufacturing method of the auxiliary pillow layer 24 are similar to those in the prior art.

The embodiment further provides a manufacturing method of the above-described display panel; and in addition to common conventional steps for producing the display panel, the manufacturing method of the display panel further comprises steps of manufacturing the color filter substrate according to the manufacturing method of the color filter substrate provided by the embodiment. In addition, the method further comprises forming each of the functional film layers 23 on the second base substrate of the array substrate, for example, forming sequentially a gate metal layer, a gate insulating layer, an active layer, a source-drain metal layer, a passivation layer and a transparent electrode layer, etc. (of course, an arrangement order of the functional film layers 23 and selection of the functional film layers 23 may be changed correspondingly according to different needs, for example, an etching stop layer may further be disposed between the active layer and the passivation layer).

Alternatively, the manufacturing method of the display panel according to an embodiment of the present invention further comprises a method for forming the auxiliary pillow layer on the array substrate.

Exemplarily, the gate metal layer and the auxiliary pillow layer 24 are formed simultaneously by a patterning process:

The second base substrate is cleaned, and exemplarily, the second base substrate may be a glass substrate or a quartz substrate and the like;

A metal thin film is deposited on the second base substrate; for example, the metal thin film is deposited on the second base substrate by using a method of magnetron sputtering or thermal evaporation; the metal thin film may be a monolayer film made of metal such as Cr, W, Ti, Ta, Mo, Al, Cu and so on or an alloy thereof, or may be a composite film made of multi-layered metal thin films;

A photoresist layer is coated on the metal thin film;

Exposing is performed by an ordinary mask, to form a photoresist retained region corresponding to the auxiliary pillow layer 24 and the gate metal layer, as well as a photoresist removed region corresponding to a region except the above-described region;

The developing treatment is performed on the photoresist; after the developing treatment, a thickness of the photoresist in the photoresist retained region is not changed, and the photoresist in the photoresist removed region is removed;

The metal thin film of the photoresist removed region is removed by an etching process;

Finally, the remaining photoresist is stripped, leaving the metal thin film, i.e., the gate metal layer including a gate and a scanning line, and the auxiliary pillow layer 24 having a center exactly coincident with a center of the pillow layer 13; and the auxiliary pillow layer 24 may be in a shape of square, polygon or circle.

Exemplarily, processes for forming the gate insulating layer, the active layer, the data line, the source-drain metal layer, the passivation layer and a via hole, etc. by a patterning process are similar to relevant processes in the prior art; for example:

The gate insulating layer covering the entire second base substrate is formed on the gate metal layer and the auxiliary pillow layer 24;

A semiconductor layer and a doped semiconductor layer are sequentially deposited on the gate insulating layer by a method such as Plasma Enhanced Chemical Vapor Deposition (PECVD); and then the source-drain metal layer is deposited by a method of magnetron sputtering or thermal evaporation;

A photoresist layer is coated on the source-drain metal layer;

Exposing is performed by the dual-tone mask, to form a photoresist completely-retained region corresponding to a region of a source electrode and a drain electrode, a photoresist partly-retained region corresponding to a channel region and a photoresist completely-removed region corresponding to a region except the above-described regions;

After the developing treatment, the thickness of the photoresist in the photoresist completely-retained region is not changed, the photoresist in the photoresist completely-removed region is removed, and the thickness of the photoresist in the photoresist partly-retained region is reduced; and then the source-drain metal layer, the doped semiconductor layer and the semiconductor layer corresponding to the photoresist completely-removed region are removed by a first etching process, to form an active layer pattern;

The photoresist in the photoresist partly-retained region is removed by an ashing process, to expose the source-drain metal layer in the region;

The source-drain metal layer and the doped semiconductor layer corresponding to the photoresist partly-retained region are removed by a second etching process, and a partial thickness of the semiconductor layer is removed, to form the source electrode, the drain electrode and the channel region;

The remaining photoresist is stripped;

The passivation layer is formed on the source electrode, the drain electrode and the channel region by using the PECVD method or in other modes;

The via hole is formed in the passivation layer by an ordinary mask process.

Alternatively, the auxiliary pillow layer 24 may also be formed in a same patterning process, for example, be formed in a same layer, with the gate insulating layer, the active layer, the source-drain metal layer, the passivation layer or the transparent electrode layer, which is similar to the above-described method, and will not be repeated here.

In the color filter substrate and the display panel provided in the embodiment, by forming the pillow layer 13 on the black matrix 12, and providing the spacer on the pillow layer 13, the compression amount of the spacer is increased, the risk of occurrence of the gravity Mura is reduced, and the picture display quality and reliability of the display device are improved; for example, the problem of insufficient compression amount of the spacer in the Oxide semiconductor TFT liquid crystal display panel can be effectively solved, so as to greatly improve performance of the Oxide semiconductor TFT liquid crystal display panel to resist the gravity Mura; and at the same time, the thickness of the pillow layer 13 in an embodiment of the present invention can be flexibly set according to needs, so as to achieve continuous change of the height of the pillow layer 13, so the compression amount of the spacer can be flexibly controlled, which is not necessarily limited to various restrictions in the prior art; in addition, the embodiment of the present invention can facilitate design of the spacer, so that the spacer is more easily manufactured, and the compression amount of the spacer can be adjusted at any time, so as to reduce influence of production line fluctuation on the picture display quality, and to provide powerful technical support for improving the manufacturing efficiency of the display device and for reducing the production cost.

A Second Embodiment

Figure 7:
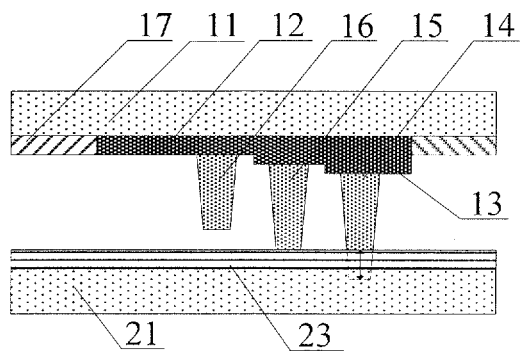
FIG. 7 is a cross-sectional structural diagram of a color filter substrate and a spacer portion in a display panel according to a second embodiment of the present invention.

The embodiment of the present invention provides a color filter substrate, as shown in FIG. 7, the color filter substrate mainly comprising: a first base substrate 11; a black matrix 12 and a color filter layer 17 disposed on the first base substrate 11; and a spacer disposed on the black matrix 12. The spacer in the embodiment includes a main spacer 14, a first auxiliary spacer 15 and a second auxiliary spacer 16, which differs from the first embodiment of the present invention mainly in that, a pillow layer 13 is of a multi-stage step-like structure in the embodiment.

Exemplarily, the pillow layer 13 may be of a three-stage step-like structure, the main spacer 14 being disposed on a highest stage, the first auxiliary spacer 15 being disposed on a second-highest stage, and the second auxiliary spacer 16 being disposed on a lowest stage; or, the pillow layer 13 may be of a two-stage step-like structure, the main spacer 14 being disposed on a highest stage, the first auxiliary spacer 15 being disposed on a lowest stage, and the second auxiliary spacer 16 being directly disposed on the black matrix 12; of course, when there are more types of spacers, the step-like pillow layer 13 of any other number of stages may be designed according to needs. For a purpose of not increasing difficulty in the process as far as possible, the pillow layer 13 in the embodiment may be of the two-stage step-like structure.

The embodiment further provides a method for manufacturing the above-described color filter substrate, in addition to common conventional steps for producing the color filter substrate, the manufacturing method of the color filter substrate further comprises a step of forming the above-described step-like pillow layer 13; here it is mainly described differences between manufacturing the pillow layer of the embodiment and the first embodiment of the present invention, and the remaining steps are similar to those in the manufacturing method of the color filter substrate according to the first embodiment of the present invention, which will not be repeated here.

Exemplarily, the method for manufacturing the two-stage step-like pillow layer 13 includes steps of:

S1: cleaning the first base substrate 11, wherein exemplarily, the first base substrate 11 may be, for example, a glass substrate or a quartz substrate; coating a non-photosensitive black resin layer 33 or other light-absorbing material layer on the first base substrate 11, a thickness of the coated black resin layer 33 directly determining a thickness of the highest stage of the pillow layer 13 finally formed, and the thickness of the highest stage of the pillow layer 13 being specifically set according to factors such as a cell gap of a display panel to be formed finally and a compression amount of the main spacer 14 (for example, if an auxiliary spacer is disposed on the array substrate, it is also necessary to consider influence of the auxiliary spacer); for example, it is derived by calculating that: a sum of thicknesses of the highest stage of the pillow layer 13 and the black matrix 12 is 1.05~3.15 μm, and correspondingly, a thickness of the coated black resin layer 33 is 1.05~3.15 μm.

S2: forming the black matrix 12 and the pillow layer 13 by two photolithographic processes.

Exemplarily, step S2 includes:

S201: coating a photoresist layer 32 on the black resin layer 33;

S202: exposing by a dual-tone mask 31, to form a photoresist completely-retained region corresponding to the pillow layer 13, a photoresist partly-retained region corresponding to a black matrix 12, and a photoresist completely-removed region corresponding to a region except the above-described regions; performing developing treatment, and after the developing treatment, completely retaining the photoresist in the photoresist completely-retained region, completely removing the photoresist in the photoresist completely-removed region, and removing a partial thickness of the photoresist in the photoresist partly-retained region;

S203: removing the black resin layer 33 in the photoresist completely-removed region by a first etching process;

S204: removing the photoresist in the photoresist partly-retained region by an asking process;

S205: removing a partial thickness of the black resin layer 33 in the photoresist partly-retained region by a second etching process;

Continuous change of the thickness of the non-photosensitive black resin layer 33 can be ensured by controlling etching time and concentration of an etching solution used in the etching, so as to flexibly control a step difference between the black matrix 12 and the pillow layer, and the thickness of the pillow layer can be flexibly set according to needs;

S206: stripping the remaining photoresist;

Thereafter, the pillow layer of the step-like structure is formed by certain steps Exemplary, it can be implemented by steps of:

S207: coating a layer of photoresist on the color filter substrate;

S208: exposing by a mask, to form the photoresist completely-removed region corresponding to a pattern of the lowest stage of the pillow layer 13 and the photoresist completely-retained region corresponding to a region except the above-described region;

S209: removing the partial thickness of the black resin layer 33 in the photoresist completely-removed region by an etching process, after the developing treatment;

S210: stripping the remaining photoresist, the black resin 33 left finally being the black matrix 12 and the pillow layer 13, and the pillow layer 13 being of the two-stage step-like structure.

Exemplarily, the second embodiment of the present invention describes the method for manufacturing the color filter substrate with the pillow layer 13 being of the two-stage step-like structure as an example, but the method for manufacturing the color filter substrate according to the second embodiment of the present invention is applicable to the pillow layer of a one-stage step-like structure, the three-stage step-like structure, and a step-like structure of any other number of stages; and the production method is similar to the above, which, for simplicity, will not be repeated here.

The manufacturing method of the color filter substrate according to this embodiment is merely an implementation method of the color filter substrate provided by this embodiment, but in fact, the embodiment of the present invention may also be implemented by modifying the implementation method through increasing or reducing the number of processes, and selecting different material or material combinations.

The embodiment further provides a display panel using the above-described color filter substrate; as shown in FIG. 7, the display panel comprises the above-described color filter substrate and the array substrate cell-assembled with the color filter substrate, the array substrate including a second base substrate 21 and a plurality of functional film layers 23 formed on the second base substrate 21; the main spacer 14 disposed on the highest stage of the pillow layer 13 being in contact with the array substrate by pressing, the first auxiliary spacer 15 disposed on the lowest stage of the pillow layer 13 being in contact with the array substrate without any compression amount, and the second auxiliary spacer 16 being suspended without being in contact with the array substrate.

Figure 8:
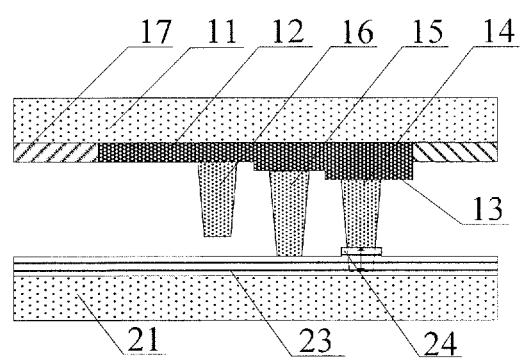
FIG. 8 is another cross-sectional structural diagram of a color filter substrate and a spacer portion in a display panel according to the second embodiment of the present invention.

Exemplarily, by performing the calculation according to a material and a size of the spacer known to the inventor, the compression amount of the main spacer 14 in contact with the array substrate by pressing is 10%~20%, which may be, for example, 15%, etc. of an initial height of the main spacer 14. Further, similar to the first embodiment, an auxiliary pillow layer 24 may also be disposed at a position on the second base substrate 21 or the functional film layer 23 corresponding to a region where the spacer is in contact with the array substrate by pressing, for which FIG. 8 may be referred to.

In this embodiment, an effect that the spacers of a same size (or a same height) can be respectively used as the main spacer 14, the first auxiliary spacer 15 and the second auxiliary spacer 16 can be achieved, by optimized control of a step difference between the highest stage and the lowest stage of the two-stage step-like pillow layer 13, a step difference between the lowest stage of the pillow layer 13 and the black matrix 12, and a thickness of the auxiliary pillow layer 24, so that complexity for designing the spacer is reduced, which is more conducive to mass production.

A Third Embodiment

The third embodiment of the present invention provides a display device comprising the display panel provided by the first embodiment or the second embodiment. Since in the display device, the compression amount of the spacer is increased by the pillow layer disposed on the black matrix, the risk of occurrence of the gravity Mura is reduced, which improves the picture display quality and reliability of the display device; in addition, the thickness of the pillow layer can be flexibly set according to needs, so the compression amount of the spacer can be flexibly controlled, which is not necessarily limited to various restrictions in the prior art, so as to improve the manufacturing efficiency of the display device and reduce the production cost.

Exemplary, the above-described display device may be: a liquid crystal display panel, an electronic paper, a liquid crystal television, a liquid crystal display, a digital photo frame, a mobile phone, a tablet personal computer, and any other product or component having a display function.

In the color filter substrate and the manufacturing method thereof, and the display panel provided by embodiments of the present invention, by forming the pillow layer on the black matrix, and providing the spacer on the pillow layer, the compression amount of the spacer is increased, the risk of occurrence of the gravity Mura is reduced, and the picture display quality and reliability of the display device are improved; in addition, the thickness of the pillow layer in embodiments of the present invention can be flexibly set according to needs to achieve continuous change of the thickness of the pillow layer, so the compression amount of the spacer can be flexibly controlled, which is not necessarily limited to various restrictions in the prior art, so as to provide powerful technical support for improving the preparation efficiency of the display device and for reducing the production costs.

The foregoing embodiments merely are exemplary embodiments of the present invention, and not intended to define the scope of the present invention. One ordinarily skilled in the art can also make various changes or modifications without departing from the spirit and scope of the present invention; therefore, all the equivalent technical solutions also belong to the scope of the present invention.

The present application claims priority of Chinese Patent Application No. 201310484617.0 filed on Oct. 15, 2013, the disclosure of which is incorporated herein by reference in its entirety as part of the present application.

What is claimed is:

1. A color filter substrate, comprising:
a first base substrate;
a black matrix, disposed on the first base substrate;
a second base substrate arranged opposite to the first base substrate; and
a plurality of spacers including a main spacer,
wherein the main spacer and the black matrix are provided with a pillow layer therebetween,
wherein the pillow layer is of a multi-stage step-like structure including a highest stage and a lowest stage,
wherein the main spacer being disposed on the highest stage of the pillow layer,
wherein an initial height of the main spacer is larger than a height of a gap between the highest stage of the pillow layer and the second base substrate,
wherein the main spacer is kept constantly contacting with the second base substrate with a compression amount,
wherein the compression amount of the main spacer in contact with the second base substrate by pressing is 10%~20% of the initial height of the main spacer, and
wherein the plurality of spacers further comprise auxiliary spacers, which comprise a first auxiliary spacer disposed on the lowest stage of the pillow layer and contacting with the second base substrate without any pressure, and a second auxiliary spacer disposed on the black matrix and spaced from the second base substrate with a gap therebetween.

2. The color filter substrate according to claim 1, wherein the pillow layer and the black matrix are of an integral structure.

3. The color filter substrate according to claim 1, wherein the main spacer and the auxiliary spacer have a same height.

4. The color filter substrate according to claim 1, wherein a sum of a thickness of the highest stage of the pillow layer and a thickness of the black matrix is 1.05 µm~3.15 µm.

5. A manufacturing method of a color filter substrate according to claim 1, comprising a step of forming the pillow layer.

6. The manufacturing method of the color filter substrate according to claim 5, wherein the forming the pillow layer comprises:
   A1: coating a photosensitive black resin layer on the first base substrate;
   A2: forming the black matrix and the pillow layer by a photolithography process.

7. The manufacturing method of the color filter substrate according to claim 6, wherein the step A2 comprises:
   A201: exposing the photosensitive black resin layer by a dual-tone mask, to form a black resin completely-retained region corresponding to the pillow layer, a black resin partly-retained region corresponding to the black matrix and a black resin completely-removed region corresponding to a region except the above-described regions;
   A202: performing developing process, completely retaining the black resin layer in the black resin completely-retained region, completely removing the black resin layer in the black resin completely-removed region, and removing a partial thickness of the black resin layer in the black resin partly-retained region.

8. The manufacturing method of the color filter substrate according to claim 5, wherein the forming the pillow layer comprises:
   S1: coating a non-photosensitive black resin layer on the first base substrate;
   S2: forming the black matrix and the pillow layer by a patterning process.

9. The manufacturing method of the color filter substrate according to claim 8, wherein the step S2 comprises:
   S201: coating a layer of photoresist on the black resin layer;
   S202: exposing the photoresist by a dual-tone mask, to form a photoresist completely-retained region corresponding to the pillow layer, a photoresist partly-retained region corresponding to the black matrix and a photoresist completely-removed region corresponding to a region except the above-described regions, and performing developing treatment;
   S203: removing the black resin layer in the photoresist completely-removed region by an etching process;
   S204: removing the photoresist in the photoresist partly-retained region by an ashing process;
   S205: removing a partial thickness of the black resin layer in the photoresist partly-retained region by an etching process;
   S206: stripping a remaining photoresist.

10. The manufacturing method of the color filter substrate according to claim 9, wherein the pillow layer to be formed is of a two-stage step-like structure, and the method further comprises after the step S206:
   S207: coating a layer of photoresist on the color filter substrate;
   S208: exposing by a mask, to form the photoresist completely-removed region corresponding to a pattern of a lowest stage of the pillow layer and the photoresist completely-retained region corresponding to a region except the above-described region;
   S209: removing a partial thickness of the black resin layer in the photoresist completely-removed region by an etching process, after a developing process;
   S210: stripping a remaining photoresist.

11. A display panel, comprising:
   a color filter substrate, according to claim 1; and
   an array substrate, cell-assembled with the color filter substrate,
   wherein at least part of spacers disposed on the pillow layer is in contact with the array substrate by pressing.

12. The display panel according to claim 11, wherein the array substrate comprises a second base substrate and a plurality of functional film layers formed on the second base substrate; an auxiliary pillow layer is disposed at a position on the second base substrate or the functional film layer corresponding to a region where the spacer is in contact with the array substrate by pressing.

13. The display panel according to claim 1, wherein a compression amount of the spacer in contact with the array substrate by pressing is 15% of the initial height of the spacer.

14. The color filter substrate according to claim 1, further comprising an auxiliary pillow layer disposed on the second base substrate corresponding to a region where the main spacer is in contact with the second base substrate by pressing.

15. A color filter substrate, comprising:
   a first base substrate;
   a black matrix, disposed on the first base substrate;
   a second base substrate arranged opposite to the first base substrate; and
   a plurality of spacers, including a main spacer,
   wherein the main spacer and the black matrix are provided with a pillow layer therebetween,
   wherein the main spacer being disposed on the pillow layer,
   wherein the pillow layer is of a multi-stage step-like structure including a highest stage and a lowest stage,
   wherein an initial height of the main spacer is larger than a height of a gap between the highest stage of the pillow layer and the second base substrate,
   wherein the main spacer is kept constantly contacting with the second base substrate with a compression amount,
   wherein the compression amount of the main spacer in contact with the second base substrate by pressing is 10%~20% of the initial height of the main spacer, and
   wherein the plurality of spacers further comprise auxiliary spacers, which comprise a first auxiliary spacer disposed on the black matrix and contacting with the second base substrate without any pressure, and a second auxiliary spacer disposed on the black matrix and spaced from the second base substrate with a gap therebetween.

16. The color filter substrate according to claim 15, further comprising an auxiliary pillow layer disposed on the second base substrate corresponding to a region where the main spacer is in contact with the second base substrate by pressing.

* * * * *